United States Patent [19]

Malcolm

[11] 4,328,940

[45] May 11, 1982

[54] METHOD OF ELECTROSTATICALLY ENHANCING DEPOSITION OF AIR BORNE SPRAY MATERIALS

[75] Inventor: David H. Malcolm, West Paterson, N.J.

[73] Assignee: Electrogasdynamics, Inc., East Hanover, N.J.

[21] Appl. No.: 932,317

[22] Filed: Aug. 9, 1978

Related U.S. Application Data

[63] Continuation of Ser. No. 315,075, Dec. 14, 1972, abandoned.

[51] Int. Cl.³ .............................................. B64D 1/18
[52] U.S. Cl. .................................... 244/136; 239/171; 239/691; 239/704; 361/218; 361/227
[58] Field of Search ...................... 244/136, 1 A, 1 R; 361/218, 227, 228; 239/171, 8, 3, 691, 704–708; 310/6

[56] References Cited

U.S. PATENT DOCUMENTS

| | | | |
|---|---|---|---|
| 1,958,406 | 5/1934 | Darrah | 239/704 |
| 2,309,584 | 1/1943 | George | 361/218 |
| 2,539,163 | 1/1951 | Robinson | 361/218 |
| 2,578,697 | 12/1951 | Gunn | 244/1 A |
| 3,035,208 | 5/1962 | Clark | 244/1 A |
| 3,283,210 | 11/1966 | Welsh | 244/1 A |
| 3,297,281 | 1/1967 | Felici | 244/136 |
| 3,521,125 | 7/1970 | Nelson | 361/227 |
| 3,572,609 | 3/1971 | Slawson | 244/1 A |
| 3,600,632 | 8/1971 | Bright et al. | 361/218 |

Primary Examiner—Galen L. Barefoot
Attorney, Agent, or Firm—Nims, Howes, Collison & Isner

[57] ABSTRACT

A method of spraying electrically charged particulate material to ground from a low flying airplane. The method includes the steps of imposing an electrical charge of given polarity upon an emitted primary spray of particulate material of sufficient magnitude to electrostatically enhance the deposition thereof and concurrently emitting a secondary spray of oppositely charged particulate material of selective character from said airborne source at a charge level of a magnitude to avoid material degradation of the charge on said primary spray intermediate its loci of emission and deposition.

3 Claims, 7 Drawing Figures

U.S. Patent May 11, 1982 Sheet 1 of 2 4,328,940
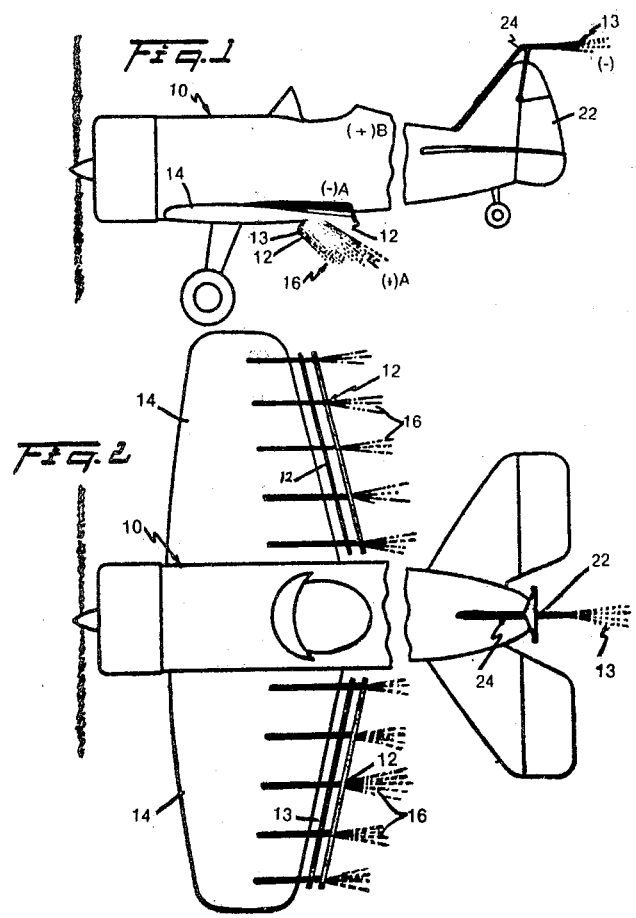

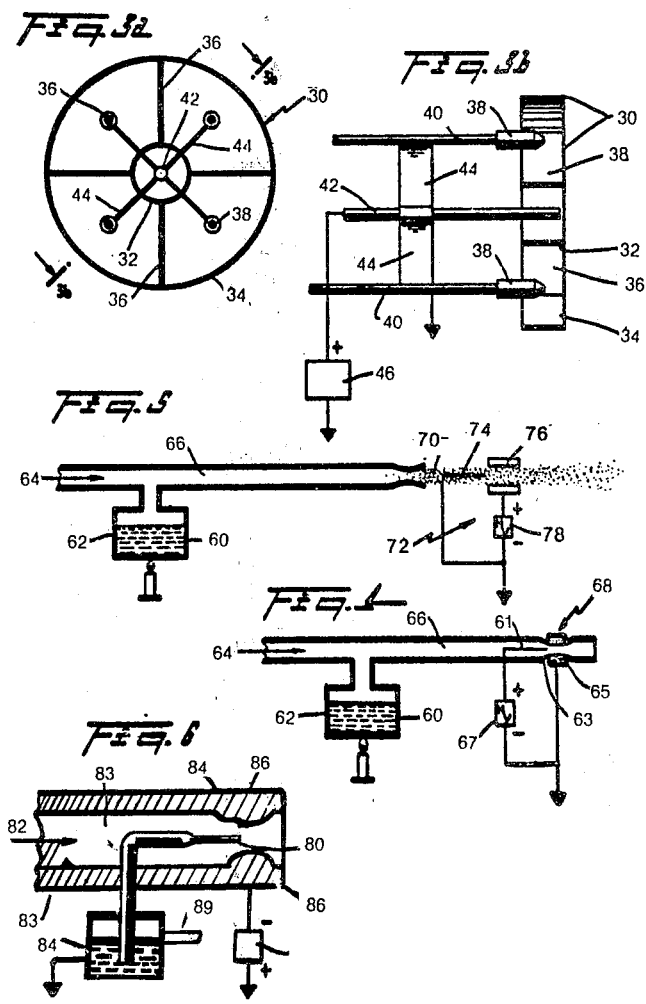

METHOD OF ELECTROSTATICALLY ENHANCING DEPOSITION OF AIR BORNE SPRAY MATERIALS

This application is a continuation of application Ser. No. 315,075 now abandoned which in turn is a continuation of application Ser. No. 97,650 now abandoned.

This invention relates to agricultural spraying techniques and particularly to methods and apparatus for effecting continuous electrostatically enhanced deposition of agriculturally beneficial particulate material from airborne sources thereof.

Although recent experimentation has indicated that enhanced deposition efficiencies with attendant material and cost savings are attainable through electrostatically enhanced deposition of agricultural dusts and sprays emanating from ground based sources, a considerable effort to date to adapt electrostatic deposition techniques to airborne spray sources, such as airplanes and helicopters, and to thereby further increase the inherent advantages of aerial, as distinguished from ground based spraying, has been singularly unsuccessful. Essentially, the emission of a charged spray from an airborne source inherently causes the electrical potential of the aircraft to rapidly rise to a high value of a polarity opposite to that of the charged spray and to quickly reach an equilibrium condition where electrostatically induced deposition is materially degraded, if not effectively destroyed. Among the unsuccessful expedients explored to date by the art to avoid, preclude or remove such deleterious potential build up on the aircraft have included alternating the polarity of the charge on the emmited material, which inherently results in an undesired mixing and neutralination of substantial portions of the emitted material, at least at all frequencies which offer any possibility of success from an electrical standpoint. Still another suggested expedient has been the provision of an auxiliary high voltage discharge of opposite polarity and concomitant charged ion generation as disclosed in the U.S. Pat. No. 3,297,281 which, apart from inherent wide operational variations attendant upon altitude, will either immediately return to the aircraft to negate the intended effect thereof or, if such high voltage discharge is sufficiently removed from the aircraft, will result in a substantial neutralisation of the emitted spray with the consequent degradation, if not effective destruction, of the desired electrostatically enhanced deposition of the emitted spray material.

This invention may be briefly described as a method and apparatus for effecting the continuous electrostatically enhanced deposition of a primary spray of agriculturally beneficial particulate material from an airborne source thereof through emission of a secondary spray of charged particulate matter of opposite polarity to that of the primary spray in such a manner as to minimize, if not effectively preclude, mixing thereof with and neutralisation of the primary spray with its attendant degradation of the deposition inducing charges thereon. In its broader aspects, the subject invention includes effecting the concimitant emission of a secondary spray of low mobility and relatively long lived particulate matter highly charged with a polarity opposite to that of the charged primary spray as well as the emission of such secondary spray from a location disposed in a high velocity air stream and relatively remote from the locus of emission of the primary spray. Still other aspects of the subject invention include effecting the emission of the secondary spray with a rate of charge removal or dissipation substantially equal to or greater than that of the primary spray so as to cause the potential on the aircraft to approximate neutral or in some instances to reach a relatively high value of polarity similar to that of the emitted charged primary spray.

Among the advantages of the subject invention is the permitted utilization of electrostatically enhanced deposition of agriculturally beneficial sprays from airborne sources thereof with attendant markedly increased material and cost savings and at no appreciable additional operating expense. Other advantages include simplicity of construction that is not only inexpensive to install and maintain but is also compatible with existent aircraft agricultural spray equipment and which has no serious deleterious effect in the airworthiness and operational characteristics of the aircraft. A further advantage is a marked increase in the width of the swath of deposited material. Still other advantages are the ready adaptability of the invention to utilization with agriculturally beneficial sprays of both liquid and solid particulate character to provide a more uniform distribution of the sprayed material including substantial increases in deposition thereof on the underside of foliage being sprayed and with savings of sprayed material of up to and sometimes exceeding as much as 50%.

The object of this invention is the provision of a method and apparatus for effecting continuous electrostatically enhanced deposition of agriculturally beneficial sprays from airborne sources thereof.

Other objects and advantages of the subject invention will become apparent from the following portions of this specification and claims and from the appended drawings which illustrate, in accord with the mandate of the patent statutes, the principles of the invention as embodied in certain presently preferred embodiments thereof.

Referring to the drawings:

FIG. 1 is a schematic elevational view of an aircraft adapted for airborne emission of agriculturally beneficial material and further adapted to incorporate and employ the principles of this invention.

FIG. 2 is a schematic plan view of the aircraft illustrated in FIG. 1.

FIG. 3a is a schematic plan view of the essentials of a suitable apparatus for atomizing and charging a secondary liquid spray.

FIG. 3b is a section taken on the line b—b of FIG. 3.

FIG. 4 is a schematic representation illustrating certain essentials of a vapor condensation type particle forming and charging system suitable for utilization in the practice of the subject invention.

FIG. 5 is a schematic representation illustrating certain essentials of a vapor condensation type particle forming and diffusion type charging system suitable for utlization in the practice of the subject invention.

FIG. 6 is a schematic representation illustrating certain essentials of an electrostatic atomization type particle forming and charging system suitable for utilization in the practice of the subject invention.

By way of introduction, it should be understood that the subject invention is broadly utilizable in conjunction with agriculturally beneficial materials of both solid and liquid character and hence, the terms "materials" or "particles" will, unless more specifically delineated, broadly encompass sensible or viewable, as distinguished from molecular, discrete particulates of solid, liquid, or composite solid-liquid character. Likewise, and unless more specifically delineated, the terms "spray" and "spraying" will broadly include the emission of solid, liquid, or composite solid-liquid material.

Referring to the drawings and initially to FIGS. 1 and 2, aircraft 10 conventionally employed for agricultural spraying or "crop dusting" operation usually operate at speeds in the vicinity of 90–100 miles per hour at as little as 2 to 12 feet above the ground and conventionally omit or eject the spray or dust 16 from a multiplicity of nozzles 12 located in the general vicinity of behind and below of the trailing edge of the wing 14, usually the lower wing of a biplane where the slipstream acts to supplement gravity and to positively displace the released material toward the ground. Under such conditions and ignoring localized ambient conditions for simplicity, about 50% of the emitted material usually reaches the ground within about 5 to 7 aircraft lengths of its locus of emission and about 80% thereof reaches the ground within 15 to 20 aircraft lengths of its locus of emission.

If an electrical charge is placed on the emitted material 16, the electrical potential of the aircraft 10 will inherently and rapidly rise to extremely high values as, for example, from 20 to 100 Kilovolts and even greater, that is of a polarity opposite to that of the charge on the emitted material and will reach, normally in one second or less, an equilibrium condition which effectively operates to neutralize the charge on the primary spray 16 of emitted material and thereby degrade, if not essentially nullify, electrostatically enhanced deposition thereof. In order to avoid this undesirable rise in potential of opposite polarity on the aircraft with its inherent nullification of the charge on the primary spray 16 and in accord with the principles of this invention, a secondary spray 18 of low mobility, relatively long lived particulate material bearing a charge opposite to that of the primary spray 16 is concurrently and continuously emitted from the aircraft 10 at a location exposed to the high velocity airstream and relatively remote from the locus of emission of the primary spray 16 so that airborne mixing thereof with and neutralization of the oppositely charged primary spray is effectively avoided. As best shown in FIG. 1, a preferred location for the emission of the oppositely charged secondary spray 18 is above and/or behind the rudder tail plane 22, as at the end of a rearwardly extending boom element 24. Most exterior parts of both the boom element 24 and the associated secondary spray ejector jet mechanism disposed therein, as will be hereinafter described, are desirably, although not essentially or nonconducting character although, in the absence of sharp corona generating edges, conducting materials may be employed in some portions thereof. All operating components for effecting the emission of the charged secondary spray particulate materials such as wires, leads, fluid lines, air lines and the like are preferably located within the boom element 24 to minimize any adverse aerodynamic effects that might be occasioned thereby.

In operation of the illustrated system, the oppositely charged particulate material of the secondary spray 18 is concurrently and continuously ejected into and is entrained in the airstream at the rear of the aicraft above and/or behind the locus of emission of the primary spray 16 and is thus left behind the aircraft so as not to return to ground in proximity with the descending primary spray. Such emission of the secondary spray particles bearing a charge opposite to that of the primary spray 16 also functions to effect a concomitant rise in potential of opposite polarity thereto on the aircraft 10 which operatively functions to neutralize the undesired potential build-up thereon that inherently results from the emission of the charged primary spray 16. Thus, by way of example and as illustrated in FIG. 1, if the primary spray bears a positive $(+)_A$ charge, its emission will inherently result in a build-up of a negative $(-)_A$ charge on the aircraft 10. However, if the secondary spray is negatively charged $(-)_B$ its emission will inherently result in a concurrent build-up of a positive $(+)_B$ charge on the aircraft 10, and as will now be apparent, the presence of such opposing charges on the aircraft operate to negate the nullifying effect of the deleterious charge build-up that inherently accumulates on the plane as a result of the emission of the primary spray 16.

As will be apparent, the above described method of ejecting two discrete charged sprays of sensible particulate material of opposite polarity, either or both of which can be an agriculturally beneficial depositant for the foliage or terrain below, permits such control of both the character and magnitude of the potential of the aircraft relative to ground as to assure electrostatically enhanced deposition of the beneficial depositant.

In the more common case where the primary spray 16 constitutes the agriculturally beneficial depositant, the secondary spray 18 should, at least for economic reasons, be of a considerably lower rate of emission and consequently should have a much higher charge per unit of mass thereof. Such low volume charged secondary spray material should also be so constituted as to be of low mobility and drift velocity and should therebyalso be such as to substantially maintain its integrity, as for example, not to evaporate, until the possibilities of intermixture thereof with the primary spray has been minimized. Also, and particularly in the case of ultra low volume spraying as will be pointed out later, the charge on the secondary spray 18 may be made sufficiently greater in magnitude than that on the primary spray 16 so as to drive the potential of the aircraft 10 up to a high potential of the same polarity as that of the primary spray. Such mode of operation permits the primary spray 16 to acquire its charge by simple contact charging by the potential difference extant between the aircraft and ground and to thus avoid the necessity of using separate charging electrode systems for the primary spray 16.

While the technique for imparting the charges to the primary spray can be any of the widely known conventional methods, a preferred technique is induction charging by a ring disposed around each nozzle or by one or more elongate electrode bars disposed in proximity to the spray nozzles as illustrated at 13.

As noted above, in systems where the primary spray 16 constitutes the agriculturally beneficial depositant, most efficient and economic operation is effected by utilization of the smallest possible mass of secondary spray material. In order to approach such objective, it is preferred, for general purpose spraying, to employ an appreciably higher charge to mass ratio of the secondary spray particles and such facilitates the utilization of a low volume of secondary spray material of a mass that is very much less, as for example, from about 1/5 to 1/1000 of that of the primary spray material. Such spray is desirably constituted by long lived, low mobility particulate material of small particle size and low cost.

Preferred operation of the inventive system described above, as evidenced by experimental results to date includes in systems for conventional low and high volume spraying and wherein the charge to mass ratio for the primary spray falls in the range of about 0.1 to about 0.75 micro coulombs/gram, the utilization of secondary spray charge to mass ratios of at least 3 to 4 times greater thereof; emittable particulate material that is characterized both by mobilities in the order of $10^{-5}$ to $10^{-7}$ meter/sec/volt/meter and by correspondingly low drift velocities suitably less than 10 feet/sec. as well as being able to maintain such characteristics for at least 2 to 3 seconds in a highly evaporative environment following emission thereof.

The utilization of particles in the size range of from about 0.1 micron up to about 50 microns suitably permit the necessary high charge to mass ratios for the secondary spray of from about 2.5 to 10,000 microcoulombs/gram and higher. Mobility of such particulates appears to be lowest for particles in the range of from about 0.2 up to about 1.0 micron in diameter and such size particles generally provide maximum drift velocities relative to the airstream of about 1 meter/second. While particulates having such characteristics can be either solid or liquid, solid particles can and usually do present auxiliary feeding and charging problems and liquid particles must be so constituted as to exist for at least 2 to 3 seconds in the highly evaporative atmospheric environment subsequent to emission. Because of the lack of control over the nature of the evaporative environment into which the secondary spray particles are emitted, all suitable secondary spray liquids must be chosen so as to have an effective life following emission of at least 2 to 3 seconds. Such requisite, depending upon the environment, can be satisfied by relatively large sized particles of a low boiling point liquid such as water, as for example, water particles up to about 50 microns and which often contain small amounts of water pump lubricant materials and by commensurately smaller sized particles of higher boiling point liquids. By way of further specific example, liquid particles may suitably comprise higher boiling point liquids or their equivalents and liquids such as high boiling point oils or glycerol or lower boiling point liquids having fatty acids or the like intermixed therewith to reduce the evaporation rate, are generally suitable. If desired, high boiling point liquids that are unduly viscous and thus present problems in both delivery and atomization may be mixed with suitable low boiling point liquids, such as water or alcohol, to form a composite low viscosity and relatively easily handled fluid of such character that when after emission, the lower boiling point constituent rapidly evaporates (often in less than a second), there will be left a small particle or droplet of the high boiling point material that possesses the necessary low mobility and long life to preclude intermixing with and neutralising of the primary spray. Likewise, the auxiliary feeding and charging problems that may be presented by certain solid particles of the desired size and character may be minimized by feeding such particle, as for example of about 1 micron in diameter, in emulsion form followed by subsequent evaporation of the liquid constituent thereof leaving the solid residue of requisite character in the airstream.

While numerous expedients may be employed to produce a secondary spray of the character above described having a suitable high charge to mass ratio, one relatively satisfactory and simple expedient is illustrated in FIGS. 3a and 3b. Such unit includes an induction type charging ring electrode assembly 30 constituted of an inner ring element 32 and a concentric outer ring element 34 disposed in spaced relation therewith by a plurality of radial support arms 36 that compositely define four separate charging quadrants. Positioned within each of the quadrants is a hydraulic atomizing nozzle 38 connected via a separate supply pipe 40 to a source of high pressure liquid. As illustrated, the induction charging ring electrode assembly 30 is mounted on an elongate support arm 42 of insulating material which additionally serves to support and properly position the grounded atomizing nozzles 38 by means of radially extending positioning spiders 44. The induction charging ring electrode assembly 30 is connected to a suitable source of high potential as schematically illustrated by the power supply 46, having its opposite side thereof connected to the ground as represented by the air frame of the dispensing aircraft.

In operation of the illustrated unit, liquid supplied under pressure through the conduits 40 through the hydraulic atomizing nozzle 38 results in the emission of a plurality of sprays of atomized liquid, suitably water, through a high potential field created by the surrounding induction ring charging assembly.

Illustrative of other suitable expedients for producing and charging secondary spray particles of the character delineated above are electrostatic atomization and vapor condensation techniques. Both of these known techniques lend themselves to simultaneous small size particle formation and charging and are capable of producing the desirable high charge to mass ratios as indicated above. Alternatively, a mist, spray or cloud of particulate matter of the requisite character may be first produced in any suitable manner and later charged by field charging in a corona discharge or by diffusion processes in the presence of molecular ions. By way of further illustrative example, FIG. 4 schematically illustrates the essentials of apparatus for forming and charging secondary spray particles of suitable character by means of vapor condensation technique. As illustrated, a high boiling point liquid 60, such as glycerol, is heated in a vessel 62 to saturate a rapidly moving primary air flow as outlined by the arrow 64 with vapor as at 66. Such vapor is condensed out of the airstream about molecular ions in an electrogasdynamic type channel 68 to produce extremely small sized charged particles at the low end of the aforesaid range having the requisite high charge to mass ratio, low mobility and because of a slow rate of evaporation, sufficient life duration following emission as to effectively preclude neutralization of the primary spray. Such electrogasdynamic type channels are generally disclosed in the literature, as for example in U.S. Pat. No. 3,417,267, and broadly include an emitter needle electrode 61 disposed within a converging channel portion 63 and having its corona emitting end located in proximity to an attractor electrode 65. The needle electrode 61 and attractor electrode 65 are connected across a high voltage power supply 67. Alternatively, and as shown in FIG. 5, a mist or spray 70 can be formed by the vapor condensation techniques as described above and then subsequently charged by a diffusion or field type charging system 72 which includes a needle emitter electrode 74 and an electrode ring 76 connected across a high voltage power supply 78.

FIG. 6 schematically illustrates certain essentials of an electrostatic capillary atomization apparatus for producing charged particles in the 1 or 2 micron range. As illustrated, such unit includes an air channel 80 accommodating a rapidly moving flow of air as evidenced by the arrow 82 therethrough and terminating in a venturi type restriction 84 at the end thereof. Located at the restriction 84 is a ring type electrode element 86 connected to the negative output terminal of a high voltage power supply 88. Disposed adjacent the venturi restriction 84 is a needlelike electrode element in the nature of the end portion of a grounded capillary tube 90 having a bore of less than about 0.025″ in diameter and connected via an enlarged conduit 92 to a fluid reservoir 94. The feed of fluid from the reservoir 94 through the conduit 92 to the capillary electrode element 90 is effected by pressure applied through tube 96. The liquid in the reservoir 94, which may comprise a high boiling point low viscosity fluid; a low viscosity mixture of high and low boiling point fluids; an emulsion of finely divided solid particulates in a low boiling point liquid or a liquid which undergoes a rapid chemical or physical change to a solid—as by oxidation or by evaporation, should be partially conducting and be maintained at a positive potential relative to that of the electrode ring 86. In operations of this type of unit, the field in the vicinity of the capillary electrode tip 90 should be maintained in the vicinity of maximum field strength and desirably just short of thebreakdown potential.

The majority of present day serial spraying operations, which are conventionally designed "low volume" spraying, normally involves the dispensing of about one gallon of depositable material per acre. In contradistinction therewith, conventionally designated "high volume" spraying normally involves the dispensing of about 10 gallons per acre, whereas dispensing of amounts in the order of about one pint per acre is conventionally designated as "ultra-low-volume" spraying. Experimental results to date appear to indicate that the now permitted electrostatically enhanced deposition of agriculturally beneficial material from an airborne source, in accord with the principles of this invention, will permit such volumes to be reduced by about one half, i.e., to about ½ gallon per acre for low volume spraying, to about 5 gallons per acre for high volume spraying and to about ½ pint per acre for ultra-low volume spraying. Under such conditions and with charge to mass ratios of about 0.10 to about 0.5 microcoulombs per gram being utilized with conventional primary spray nozzles for the primary spray, and which to date has provided relatively good wrap-around characteristics, the current requirements for the secondary spray have ranged from a low of about 10 microamps for ultra-low volume spraying, through about 100 microamps for low volume spraying and up to about 500 or more microamps for high volume spraying. Thus, in order to meet the deposition requirements of general low-volume spraying, the secondary spray ejector jet emission system must be capable of operating, at a minimum, at about a 100 microamp of current level. A secondary spray ejector charging system having a 150 microamp removal capability will probably be well able to accommodate most, if not all spraying applications that presently would involve deposition of up to 2 gallons of depositant per acre and such would appear to be quite adequate to satisfy the requirements of conventional present day general purpose spraying. It will likewise now be apparent that additional current removal capabilities must be provided in the secondary spray emission system if high volume spraying techniques are to be employed and such, of course, can readily be achieved by the use of multiple secondary ejector jet assemblies.

In operation of units of the type described above, some types of secondary spray ejector jet emission assemblies may require a compressed air supply in addition to the liquid feed system for charge spray generating purposes. For practical purposes, the amount of compressed air flow should be kept as small as possible and desirably below 20 standard cubic feet per minute. Under conditions practiced in experimental spray operations to date, those secondary ejector jet emission assemblies utilizing compressed air have produced about five microamps of removal current per standard cubic feet per minute of compressed air flow. Actual air pressures appear to be of secondary consideration and the flow rate of the liquid component of the secondary spray is essentially determined by the charge to mass ratio requirements as discussed above. However, by far, the majority of the secondary spray charging and emission assemblies tested to date have employed high pressure low volume hydraulic nozzles together with an induction charging system as illustrated in FIGS. 3A and 3B and described above. These types of ejector jet assemblies do not in general require any auxiliary air but atomize in the usual fashion of hydraulic nozzles by using a high pressure fluid system. The typical charge to mass ratios when using this type of system and with fine atomization have generally been in the range 2 to 10 microcoulombs per gram.

When ultra low volume spray operations are being utilized for the primary spray, the size of the emitted primary spray particles will generally be extremely small and, as such, will usually bear an appreciably higher charge to mass ratio. Under such conditions, the current carrying levels of the secondary spray ejector jet system must still reach comparatively high values. Thus, for high, low and ultra-low volume spraying operations in order to desirably minimize the mass flow of secondary spray material, whil still maintaining high rates of charge emission, resort must be had to effect the emission of extremely small sized particles either singly or through multiple ejector jet assemblies to accommodate the necessary high currents. Water is generally a suitable medium for the secondary spray material for ultra-low, low and high volume primary spray operations. However, advantage may be gained in some instances where extremely high primary spray current is desired by the utilization of specialized secondary spray materials of extremely small particle size so that the charge to mass ratios thereon may be raised to such very high values as to bring the aircraft back to substantial neutrality or to an effective operating potential of a polarity similar to that of the emitted primary spray.

As previously pointed out, practice of the invention also encompasses certain situations wherein the secondary spray can also be constituted of agriculturally beneficial material, and that electrostatically enhanced deposition thereof will be effected, at least in some degree, as long as the charge can be maintained upon such emitted material. The desired maintenance of such charge is essentially determined by the life of the emitted secondary spray particles in the highly evaporative environment following the emission thereof and in such instance, the secondary spray material must be possessed of a longevity appreciably greater than the 2 to 3 second life duration mentioned earlier.

As briefly described at an earlier point in this specification, practice of the present invention makes possible at least two different basic modes of airborne electrostatic spray depositing operations. The first of these is effected by maintaining the current level of the secondary spray emission at a magnitude sufficient to maintain the potential of the aircraft at approximate neutrality as by effecting the removal of charge in an amount equal to that being removed by the primary spray but of a polarity opposite thereto. Such mode of operation will most likely be that most commonly employed in the practice of the invention and will be generally quite adequate for conventional low volume spray applications and very probably also for many, if not most, high volume spray applications since in the latter cases the charge to mass ratio for the primary spray will normally be smaller than that for the low volume and ultra-low volume spray operations.

A second mode of operation is to effect the ejection of charge from the aircraft by means of the secondary spray at somewhat higher current levels so as to deliberately effect a selective high potential build-up on the plane thereby of a charge identical to that being placed on the emitted primary spray. Such mode of operation and the resultant selective build-up of charge on the aircraft will permit the contact charging of partially conducting or conducting primary sprays of agriculturally beneficial depositants due to the very presence of the selective field between the aircraft and the ground. In order to effect such contact charging of the primary spray, it is desirable to have the field around the primary spray nozzles as strong as possible and for such reason it will often be advantageous to drop the primary spray nozzles down and away from the aircraft body or wing elements by as much as 4 to 20 inches so as to overcome the shielding effect of the aircraft structural elements. In this mode of operation, the charge removal capability of the secondary spray ejector jet assembly must necessarily be higher than that of the primary spray with the equilibrium potential being determined by the current drain effected through corona leakage from the aircraft to ground and possibly between the aircraft and the secondary spray.

Having thus described my invention, I claim:

1. In the spraying of particulate material to ground from an airplane flying in close proximity thereto, the steps of imposing an electrical charge of given polarity upon a primary spray of particulate material continuously emitted from the underside of said airplane and at a location well forward of the tail section thereof, said charge being of sufficient magnitude to electrostatically enhance the deposition of said emitted primary spray particles, and concurrently physically and continuously emitting a secondary spray of oppositely charged particulate material in the form of a rearwardly directed jet from the tail section of said airplane at a location disposed well above the locus of emission of said primary spray and at a current level of a magnitude to avoid material degradation of the charge on said primary spray intermediate its loci of emission and deposition and at a charge to mass ratio of at least three times greater than the charge to mass ratio for said primary spray said secondary spray particles being from 0.1 to 50 microns in diameter and having, under ambient conditions, a mobility no greater than $10^{-5}$ meters per second per volt per meter and a useful life of at least one second after emission so that at least the major portion of the charged primary spray particles will be deposited without neutralization of the charge thereon by interaction with said secondary spray particles.

2. The method as set forth in claim 1 including the step of emitting said secondary spray at a current level sufficient to maintain the airborne source at a potential of the same polarity as that of the charged primary spray and of a magnitude sufficient to effect contact charging of said primary spray thereby.

3. The method as set forth in claim 1 wherein the locus of emission of said secondary spray is at the top of the rudder of the airplane.

* * * * *